United States Patent
Zwirner et al.

(10) Patent No.: US 9,734,442 B2
(45) Date of Patent: Aug. 15, 2017

(54) LUMID BARCODE FORMAT

(75) Inventors: Eric William Zwirner, Dayton, OH (US); John B. Holz, Natick, MA (US)

(73) Assignee: NCR Corporation, Duluth, GA (US)

( * ) Notice: Subject to any disclaimer, the term of this patent is extended or adjusted under 35 U.S.C. 154(b) by 1909 days.

(21) Appl. No.: 12/100,058

(22) Filed: Apr. 9, 2008

(65) Prior Publication Data

US 2009/0108081 A1     Apr. 30, 2009

Related U.S. Application Data (60) Provisional application No. 60/984,215, filed on Oct. 31, 2007.

(51) Int. Cl.
  *G06K 19/06* (2006.01)
  *G06K 19/14* (2006.01)

(52) U.S. Cl.
  CPC ....... *G06K 19/06* (2013.01); *G06K 19/06056* (2013.01); *G06K 19/14* (2013.01); *G06K 2019/06225* (2013.01)

(58) Field of Classification Search
  USPC ................................................. 235/494, 462
  See application file for complete search history.

(56) References Cited

U.S. PATENT DOCUMENTS

| | | | |
|---|---|---|---|
| 3,412,245 A | 11/1968 | Halverson | |
| 3,473,027 A | 10/1969 | Freeman et al. | |
| 3,522,191 A | 7/1970 | Turner et al. | |
| 3,582,623 A | 6/1971 | Rothery et al. | |
| 3,650,400 A | 3/1972 | Warren et al. | |
| 3,666,946 A | 5/1972 | Trimble | |
| 3,816,328 A | 6/1974 | Levene | |
| 4,047,033 A | 9/1977 | Malmberg et al. | |
| 4,451,521 A | 5/1984 | Kaule et al. | |
| 4,736,425 A | 4/1988 | Jalon | |
| 5,209,513 A | 5/1993 | Batelli et al. | |
| 5,586,787 A | 12/1996 | Brown et al. | |
| 5,605,650 A | 2/1997 | Cleary | |
| 5,786,219 A | 7/1998 | Zhang et al. | |
| 5,819,124 A | 10/1998 | Sommer et al. | |
| 5,837,042 A | 11/1998 | Lent et al. | |

(Continued)

FOREIGN PATENT DOCUMENTS

| EP | 0 700 980 | 3/1996 |
|---|---|---|
| EP | 1 116 755 | 7/2001 |

(Continued)

OTHER PUBLICATIONS

Meltzer et al., "Relaxation between closely spaced electronic levels of rare-earth ions doped in nanocrystals embedded in glass", Physical Review B 66, 22402 (2002), Dec. 13, 2002.

(Continued)

*Primary Examiner* — Michael G Lee
*Assistant Examiner* — Tabitha Chedekel
(74) *Attorney, Agent, or Firm* — Harden E. Stevens, III; Schwegman, Lundberg & Woessner (57) ABSTRACT

A security feature and a method for creating a barcode are disclosed. Data is concatenating to be represented in the barcode. The concatenated data is partitioned into n-bit segments. The formatted data is encoded by assigning a respective code to each n-bit segment. The barcode is created using the encoded data.

20 Claims, 7 Drawing Sheets

(56) References Cited

U.S. PATENT DOCUMENTS

| | | | |
|---|---|---|---|
| 6,165,592 | A | 12/2000 | Berger et al. |
| 6,211,526 | B1 | 4/2001 | Huston et al. |
| 6,297,508 | B1 | 10/2001 | Barmore et al. |
| 6,344,261 | B1 | 2/2002 | Kaule et al. |
| 6,356,196 | B1 | 3/2002 | Wong et al. |
| 6,383,618 | B1 | 5/2002 | Kaule et al. |
| 6,479,133 | B1 | 11/2002 | Kaule et al. |
| 6,503,603 | B1 | 1/2003 | Kaule et al. |
| 6,506,476 | B1 | 1/2003 | Kaule et al. |
| 6,510,237 | B1 | 1/2003 | Peltie et al. |
| 6,564,687 | B2 | 5/2003 | Poole |
| 6,576,155 | B1 | 6/2003 | Babbera-Guillem |
| 6,613,137 | B2 | 9/2003 | Egger et al. |
| 6,678,577 | B1 | 1/2004 | Stylli et al. |
| 6,832,139 | B2 | 12/2004 | Johnson et al. |
| 6,899,827 | B2 | 5/2005 | Lauf et al. |
| 6,966,998 | B1 | 11/2005 | Spowart |
| 7,079,230 | B1 | 7/2006 | McInerney et al. |
| 7,246,748 | B1 * | 7/2007 | Feuerman .......... G06K 17/0022 235/462.09 |
| 7,338,768 | B1 | 3/2008 | Trau et al. |
| 7,422,158 | B2 | 9/2008 | Auslander et al. |
| 2001/0050753 | A1 | 12/2001 | Tucker |
| 2002/0055555 | A1 | 5/2002 | Kuntz et al. |
| 2002/0124772 | A1 | 9/2002 | Egger et al. |
| 2002/0164021 | A1 * | 11/2002 | Sandru .................. 380/54 |
| 2003/0143426 | A1 | 7/2003 | Haneda et al. |
| 2004/0031931 | A1 | 2/2004 | Muller et al. |
| 2004/0171076 | A1 | 9/2004 | Dejneka et al. |
| 2004/0227112 | A1 | 11/2004 | Howard |
| 2005/0099475 | A1 | 5/2005 | Barreto |
| 2005/0173527 | A1 | 8/2005 | Conzola |
| 2005/0178841 | A1 | 8/2005 | Jones et al. |
| 2005/0259844 | A1 * | 11/2005 | Kot et al. ................. 382/100 |
| 2006/0002610 | A1 * | 1/2006 | Suomela et al. ............ 382/232 |
| 2006/0029753 | A1 | 2/2006 | Kuo et al. |
| 2006/0033325 | A1 * | 2/2006 | Maruvada ........... G11B 23/281 283/95 |
| 2006/0046002 | A1 | 3/2006 | Kuo et al. |
| 2006/0086901 | A1 | 4/2006 | Price et al. |
| 2006/0153616 | A1 * | 7/2006 | Hofmann ................... 400/62 |
| 2006/0157574 | A1 * | 7/2006 | Farrar et al. ................ 235/494 |

FOREIGN PATENT DOCUMENTS

| | | | |
|---|---|---|---|
| EP | 1 117 060 | 7/2001 | |
| EP | 1 158 459 | 11/2001 | |
| EP | 1 158 456 | 1/2007 | |
| FR | 2 556 867 | 6/1985 | |
| GB | 2 258 659 | 2/1993 | |
| JP | 49-99609 | 9/1974 | |
| JP | 49-99610 | 9/1974 | |
| JP | 1 182 738 | 7/1989 | |
| JP | 2004/070960 | 3/2004 | |
| WO | 95/12863 | 5/1995 | |
| WO | WO9512863 A1 * | 5/1995 | ............ G06K 19/06 |
| WO | WO 97/10307 | 3/1997 | |
| WO | WO 00/27645 | 5/2000 | |
| WO | WO 03/105075 | 12/2003 | |

OTHER PUBLICATIONS

Gordon et al., "Optical properties of perfluorocyclobutyl polymers. III. Spectroscopic characterization of rare-earth-doped perfluorocyclobutyl polymers", J. Opt. Soc. Am. B/vol. 22, No. 8/ Aug. 2005.

Meltzer et al., "Evidence for long-range interactions between rare-earth impurity ions in nanocrystals embedded in amorphous matrices with the two-level systems of the matrix", Physical Review B, vol. 64, 100201(R).

"Microscopic glass ribbons provide molecular labels", Science News, Feb. 8, 2003.

Officer et al., "Novel online security system based on rare-earth doped glass micro beads", Proc. of SPIE—IS&T Electronic Imaging, SPIE vol. 5310 and IS&T, Jan. 20, 2004.

Dejneka et al., "Rare earth-doped glass microbarcodes", Science and Technology Division, Corning Incorporated, Corning NY 14831, Jan. 21, 2003, vol. 100, No. 2, pp. 389-393.

"Plastic sheet and card, and method for preventing forgery of card", Patent Abstracts of Japan, Jul. 31, 2001.

"SO/IEC 16022:2000. Information Technology. Automatic identification and data capture techniques. Data Matrix bar code symbology specification", International Standard ISO/IEC, ISO/IEC, CH, vol. 16022:2000—ICS 01.080.50; 35.040, Jan. 1, 2004 (Jan. 1, 2004), pp. 1-100, XP008161680, p. 44.

Extended European Search Report dtd Nov. 24, 2014, issued in EP 08843974.0.

* cited by examiner

BTu6JL1PZbEN8qczhK

```
0:  CU_$15[vN34TYIQO,6{t7g9rjeBG+KLVMh@o?bdEXZ~u-pm82>a&D.JH|l<WPSiR
1:  82&vm9f3Yz,$<6q0JIXHa}SO-7>tiw]o?ZbKDlNd[g4@xcGMCj~kp1eB=Tn5QuEW
2:  ipZm@tTIr3]eORLJ.CB&bElx-vkQ,o|wsYcj?UKM9H$1GD<+[S74F6}AV0_WaX=5
3:  ,n4HzU1.+ylb$6xeT-_Cl[J2WGrswS8L}NDgE|u~VdjZhM{K5=q9cXO<ia0R&mtF
4:  <nATQ@+We}oNY|tijKCO>yaUD[=G9VZ0BlElr?7qp4&,$]3HdXRzgLf8Mx{6wk_u
5:  M5e,DbFLqTYultUwBS?iXW6a7<cn=EsH-@d}ofp2jV{.19x_R0ZN8gC~m|ry]+$[
6:  xbgdjOIGl5hmNXDc2M~yu<-R?zK4$fW|[CPv}+9U=e8,ZTkpVi1wr_EtH{nLaS6]
7:  ZzUCdTn~il7MX]c1JqRF4hswv2<.aQS6rep8DKtb?|myLEW&@$+YO-N_P3l0H}A5
8:  H{pFP,TzBckut7jmfN~Q-qb<>1J=e[Is&62KoAn8.SCvLZxXYDO+l9a?y$ViM@}3
9:  0iYpS9xQl&}Fl6=ycsW|mov+Xk7K,-U4$Cqtje.EPuDB>n<@bJ_wM5TOV]R[18gG
10: |+-euM}YTvX<5IhDQHdUV&F$J@BzGR3[8Aa9S2Cfpn.x0>qo1=WOEN]kmZbs{4Kc
11: H_2c1=x[seNDSpB]?{EF7olLb-V|w}gvt$kA4&PURGhmry>f@ZT3zn+JW,Yd0IaM
12: XZftO-hiYWM3gElxQl0H9,z8A|ok<aLBRNd@D=5T?GP.$}u_2+cj{nm[rw~CeVv|
13: vd~uKbD|$@rBqh[Ve6J]csG2MRN1XtWI&zg_L-=oC<+Zf5nx{A8,HT>9UQPml3.0
14: 9Y8-BgO&jlECW}Fmc|Akwt.P?4<nJ75=GS,Rr6$DX+yZ[pINz@2ViUTqboxM03ha
15: Y@<S1s5eNr9_8moGkF-QvuOXA|.iJHf?wg&[h>z}Cd,xPq$MEblapRjKV0Wy64{2
16: Ff]Dr$K0mc[Hluwv{dTB?<l,yqJpP}g.WG|3xi79nNSE@X8CQ1MktY6+4LVO&Uj5
17: >m05or39}T<UXHqNvg.scxMPKA6]u&$=z7jOylC8b{,+|pDFSltfe4RWV1kZdE_@
```

LUMID BARCODE FORMAT

This application claims priority from U.S. Provisional Application 60/984,215, entitled "LUMID BARCODE FORMAT" which was filed on Oct. 31, 2007.

BACKGROUND

Barcodes are often used to identify the item to which they are attached. Such barcodes, like the items they identify, can sometimes be counterfeited.

SUMMARY

In general, in one aspect, the invention features a method for creating a barcode. The method includes concatenating data to be represented in the barcode, partitioning the concatenated data into n-bit segments, encoding the formatted data by assigning a respective code to each n-bit segment, and creating the barcode using the encoded data.

Implementations of the invention may include one or more of the following. The method may further include scrambling the encoded data. Scrambling the encoded data may include changing the positions of at least some of the n-bit segments. Scrambling the encoded data may include changing the positions of at least some of the n-bit segments but not the first M n-bit segments where the first M n-bit segments define how the encoded data is scrambled. Assigning a respective code to each n-bit segment may include assigning each n-bit segment a code using base$2^n$ encoding. Assigning a respective code to each n-bit segment may include assigning each n-bit segment a code using base64 encoding. Each n-bit segment may have a position within the assembled data. Assigning a respective code to each n-bit segment may include looking up the respective code to be assigned to each n-bit segment in a table based on the position of the n-bit segment within the assembled data and the value of the n-bit segment. Each n-bit segment may have a position within the assembled data. Assigning a respective code to each n-bit segment may include looking up the respective code to be assigned to each n-bit segment in one of a plurality of tables based on the position of the n-bit segment within the assembled data and the value of the n-bit segment.

In general, in another aspect, the invention features a barcode creation system. The barcode creation system includes a data concatenator for concatenating data to be represented in the barcode, a data partitioner for partitioning the concatenated data into n-bit segments, a data encoder for encoding the formatted data by assigning a respective code to each n-bit segment, and a barcode creator for creating the barcode using the encoded data.

In general, in another aspect, the invention features a security feature. The security feature includes an overt barcode having contents, a covert barcode having contents, data readable from the contents of the overt barcode and the contents of the covert barcode, the data comprising overt barcode data and covert barcode data, and a feature in the data that increases the likelihood of identifying the overt barcode data as being from the overt barcode and the covert barcode data as being from the covert barcode.

Implementations of the invention may include one or more of the following. The feature may be a key having a known value in the covert barcode data that identifies it as the covert barcode data. The key may be a bit string. The bit string may be 11 bits long. The feature may be selected to increase the likelihood to greater than 99.9 percent. The feature may be a bit string that has a known location and value in the covert barcode but not in the overt barcode. The feature may be included in the covert barcode data. The feature may be covert barcode data length.

In general, in another aspect, the invention features a method for creating a security feature. The security feature includes data. The method includes creating an overt barcode having contents. The contents include an overt barcode data as a portion of the data. The method further includes creating a covert barcode having contents. The contents include covert barcode data as a portion of the data. The data includes a feature that increases the likelihood of identifying the overt barcode data as being from the overt barcode and the covert barcode data as being from the covert barcode.

DETAILED DESCRIPTION

Figure 1:
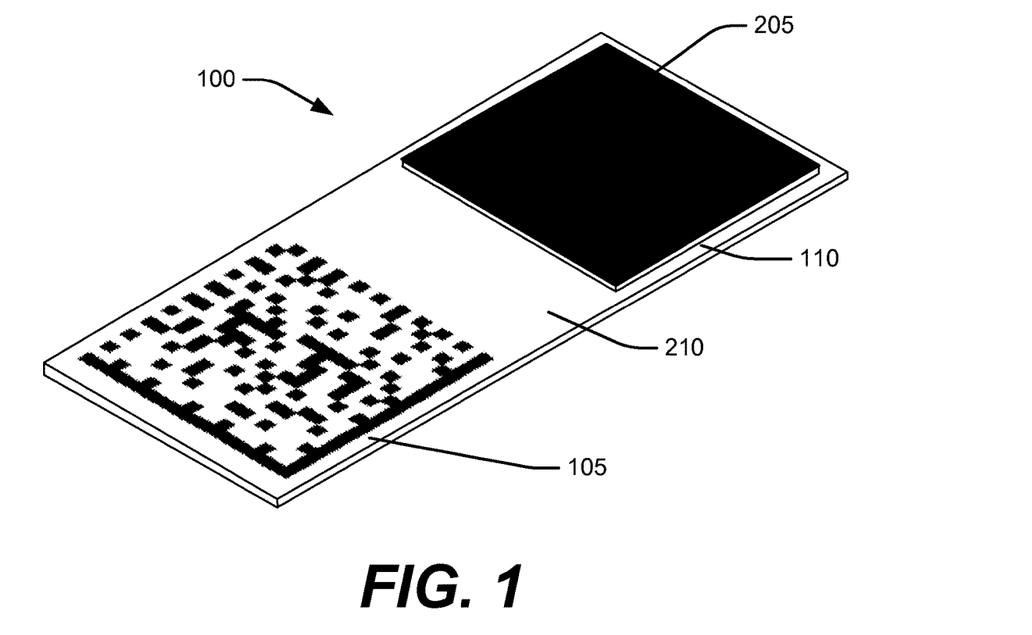
FIG. 1 shows an embodiment of a security feature.

A spatial security feature 100 includes an overt feature 105 and a covert feature 110 on a substrate 210, as shown in FIG. 1. The overt feature 105, shown as a two-dimensional barcode, is visible to the unaided eye under normal (e.g., ambient) light conditions. The covert feature 110, which may similarly be in the form of a two-dimensional barcode, is invisible to the unaided eye under normal (e.g., ambient) light conditions. It should be noted that while the covert feature 110 is shown as black in FIG. 1, it may be any color or colorless under normal lighting. In a preferred embodiment, the color of the covert feature 110 is selected to match or be transparent with respect to the color of the substrate 210 under normal (e.g., ambient) light conditions.

The overt feature 105 can include a visible image, such as a barcode, printed with any suitable material and/or technique such as, but not limited to, inkjet, laser, impact (e.g., dot matrix), thermal (e.g., direct and/or thermal transfer), lithographic, flexographic, gravure, and the like. In a preferred embodiment, the overt feature is variably printed using a variable print technology (e.g., via inkjet, laser, impact, thermal, and the like) for enhanced security.

Figure 2:
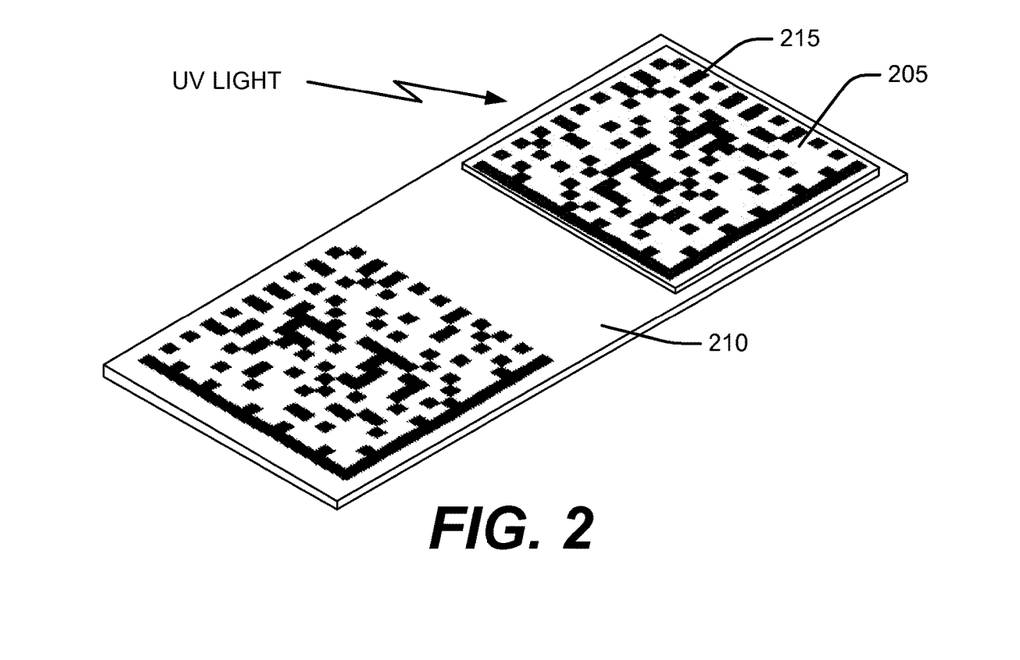
FIG. 2 shows a security feature illuminated by ultraviolet light.

The covert feature 110 can include a patch of photoluminescent material 205 printed on or otherwise applied to a substrate 210 proximate to the overt feature 105, as shown in FIGS. 1 and 2. The photoluminescent material 205 can include a "luminophore," which is a compound or composition that undergoes luminescent (e.g., fluorescent and/or phosphorescent) emission at one or more characteristic emission wavelengths (e.g., exhibits emission peaks) when excited by an illumination source of a given wavelength (e.g., infrared (IR) and/or ultraviolet (UV) light). The photoluminescent material 205 may be applied to the substrate 210 by using a non-variable data print technology such as flexographic or lithographic printing through use of a suitable flexographic or lithographic press.

As shown in FIG. 2, the patch of photoluminescent material 205 can be overlaid by an image formed from or in a material 215 that absorbs light of a wavelength which excites the luminophore in the photoluminescent material 205 to luminesce (e.g., a material which absorbs IR and/or UV light). The overlaid absorbing material 215 is shown in FIG. 2 as numerous small black squares in the form of a two-dimensional covert barcode. In alternate embodiments, a negative image, such as a negative of the two-dimensional covert barcode of FIG. 2, may be printed with the overlaid absorbing material 215. The absorbent material 215 may be printed or otherwise applied on top of the invisible photoluminescent material 205 (block 310, see FIG. 3) using variable data printing technology such as, but not limited to, inkjet, laser, impact (e.g., dot matrix), thermal (e.g., direct and/or thermal transfer), and the like.

It will be understood that the photoluminescent material 205 is not limited to material that luminesces in the presence of UV light. The photoluminescent material 205 may luminesce in the presence of light of other wavelengths. Similarly the absorbent material 215 may absorb light of wavelengths other than UV. In general the absorbent material 215 absorbs light that would cause the photoluminescent material 205 to luminesce and/or absorbs light at wavelengths at which the photoluminescent material 205 luminesces. Likewise, the absorbent material 215 may additionally or alternatively scatter light that would cause the photoluminescent material 205 to luminesce and/or scatter light at wavelengths at which the photoluminescent material 205 luminesces.

In general, the absorbent material 215 is selected such that it is transparent or its color matches that of the photoluminescent material 205 under ambient light conditions, thereby rendering a pattern printed in or with the absorbent material 215 (e.g., the two-dimensional barcode of FIG. 2) invisible under ambient conditions. For example, in one embodiment, the absorbent material 215 does not absorb visible light and is, as such, transparent or white under ambient light conditions. In another embodiment, the photoluminescent and absorbent materials 205, 215 are black (e.g., absorb all wavelengths) in ambient visible light, rendering the two-dimensional barcode of FIG. 2 "invisible" as shown in FIG. 1. However, when exposed to light at a wavelength at which the absorbent material 215 is selected to absorb and the photoluminescent material 205 is selected to luminesce (e.g., UV light), the areas with the absorbent material 215 appear as dark portions (e.g., small squares) in a background of light, as shown in FIG. 2. Using this method, dynamic covert barcodes or other covert (re. secure) information can be printed.

Figure 4:
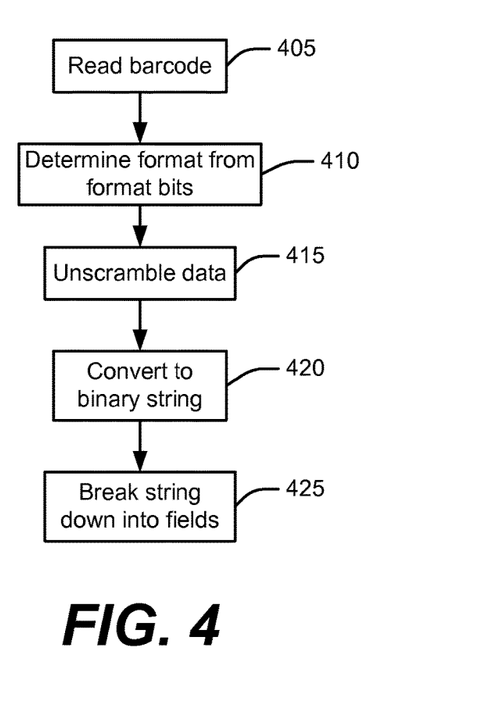
FIG. 4 shows a flow chart of an embodiment of a process for reading a barcode.

As disclosed above, the photoluminescent material 205 may be chosen to have a color other than black, such as white, in ambient (e.g., visible) light. Similarly, the absorbent material 215 may be chosen to have the same color (e.g., white), or be transparent in ambient (e.g., visible) light. In that case, the covert barcode 110 would appear as a patch of the chosen color (e.g., white) in ambient (e.g., visible) light, as shown in FIG. 4.

Likewise, in some embodiments, an overt feature 105 can include a patch of photoluminescent material 205 printed (e.g., by a non-variable data print technology) on or otherwise applied to a substrate 210 such that the photoluminescent material 205 underlies the overt feature 105, wherein the color of the overt feature 105 is different from the color of the photoluminescent material 205 and/or the substrate 210 when viewed under ambient light conditions rendering the overt feature 105 visible (re. overt). Depending on the embodiment, the overt feature 105 may comprise a material which absorbs and/or scatters light that would cause the underlying photoluminescent material 205 to luminesce, and/or absorbs and/or scatters light at wavelengths at which the photoluminescent material 205 luminesces, thereby permitting the overt feature to be read upon excitation of and luminescence by the associated photoluminescent material 205. Further, in some embodiments, the photoluminescent material 205 underlying the overt feature 105 may be the same as the photoluminescent material 205 underlying an associated covert feature 110 comprising a security feature 100 such that the overt and covert features 105, 110 may be simultaneously or substantially simultaneously read through excitation and luminescence at one or more common wavelengths using a common (single) scanner/reader.

In one embodiment, the overt and covert features 105, 110 are barcodes. In one embodiment, the overt barcode is coded with overt barcode data and the covert barcode is coded with covert barcode data. While the overt and covert features 105, 110 will be referred to as overt and covert barcodes 105, 110, it will be understood that the overt and covert features are not limited to barcodes and can be other types of security features.

Figure 3:
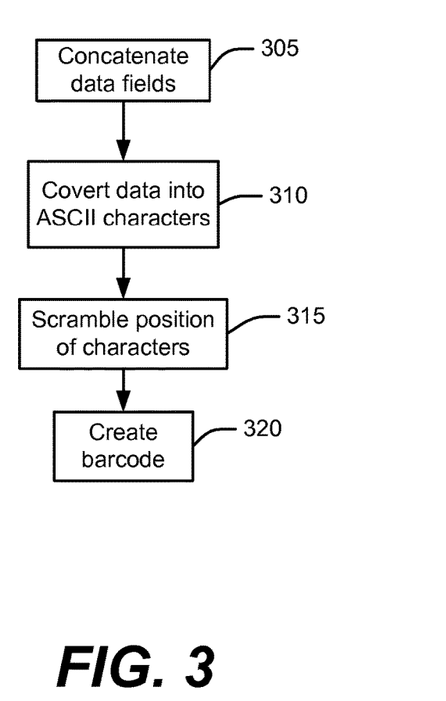
FIG. 3 shows a flow chart of an embodiment of a process for creating a barcode.

In one embodiment, the overt and covert barcodes 105, 110 are created as shown in FIG. 3. In one embodiment, data is first assembled by concatenating a set of binary data fields (block 305), which produces a bit stream such as that shown in FIG. 5. Each data field includes a defined number of bits. In one embodiment, the assembled data is converted into ASCII characters (block 310). In one embodiment, such as that shown in FIG. 6, the assembled data is converted into ASCII characters where every 6 bits is a character. In one embodiment, the assembled data is converted into printable ASCII characters. This is done because most, if not all, barcode readers will accept printable ASCII characters. It will be understood that this is not a limitation but merely an example. The data may be converted using the entire ASCII character set, including non-printable characters, or it may be converted into an entirely different format. Further, the conversion at each character position may be different, as discussed below with respect to FIG. 11.

In one embodiment, the character positions are scrambled (block 315), as described below with respect to FIGS. 8 and 9. In one embodiment, the first n characters, where "n" is rarely greater than 2, are not scrambled. In one embodiment, the first n characters serve as format characters which, among other things, define how the characters are scrambled, i.e., the scrambling "rules." In one embodiment, one possible scrambling definition is that the characters are not scrambled at all.

In one embodiment, the resulting data is used to create a barcode (block 320). Creating a barcode may include printing the barcode as described above or it may involve some other technique, such as displaying the barcode on a display, e.g., a computer monitor or a cellular telephone display.

In one embodiment, the data used to create the overt barcode in step 320 is provided by a customer and is not under the control of the entity that creates the data used to create the covert barcode.

Figure 11:
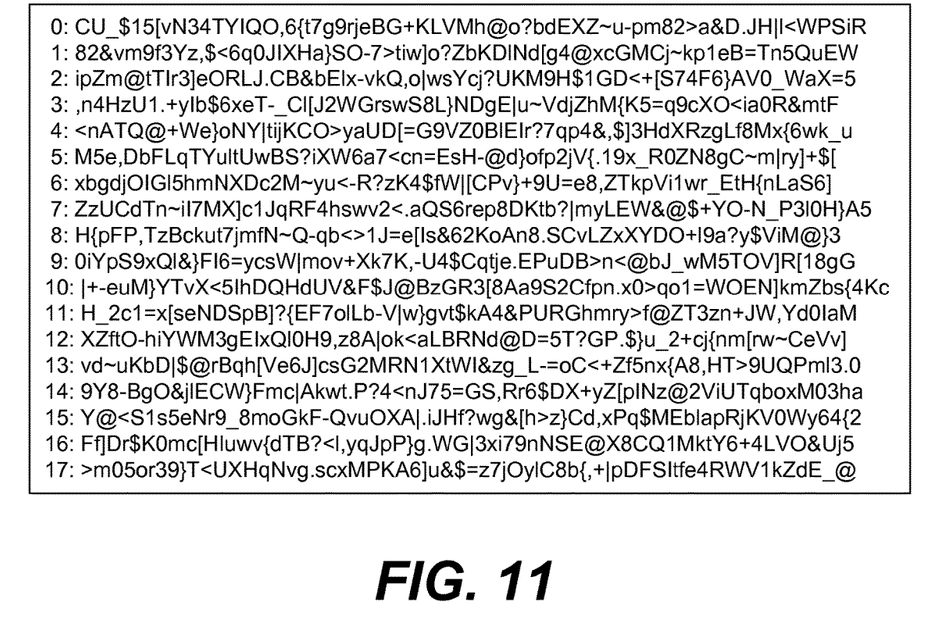
FIG. 11 shows an embodiment of a table used to code data.

In one embodiment, when the security feature is read, the overt and covert barcodes 105, 110 are read (block 405), as shown in FIG. 4. In one embodiment, the format of the overt barcode is determined from the first n bits of the overt barcode data and the format of the covert barcode is determined from the first n bits of the covert barcode data (block 410). Note that in the circumstances in which the overt barcode data is provided by the customer the entity that creates the covert barcode has no control over the format of the overt barcode data and block 410 is not performed for the overt barcode data. In one embodiment, the number of format characters in the overt barcode data is different from the number of format characters in the covert barcode data. In one embodiment, as described above, the format characters are not scrambled. In one embodiment, the format characters define how the characters are scrambled. The data is unscrambled using that information (block 415). In one embodiment, the data is converted into a binary string (block 420). In one embodiment, a table such as that shown in FIG. 11 is used in the conversion. In one embodiment, where a table such as that shown in FIG. 11 is used to convert the data, the table is not used for the format characters. Instead, a standard conversion, such as the base64 conversion shown below, is used for the format characters. In one embodiment, the binary string is broken down into fields (block 425). The fields can then be presented, for example on a point of sale terminal. In one embodiment, the format characters define whether a table such as that shown in FIG. 11 is used in the conversion, and, if there is more than one such table, which of the tables is used.

Figure 5:
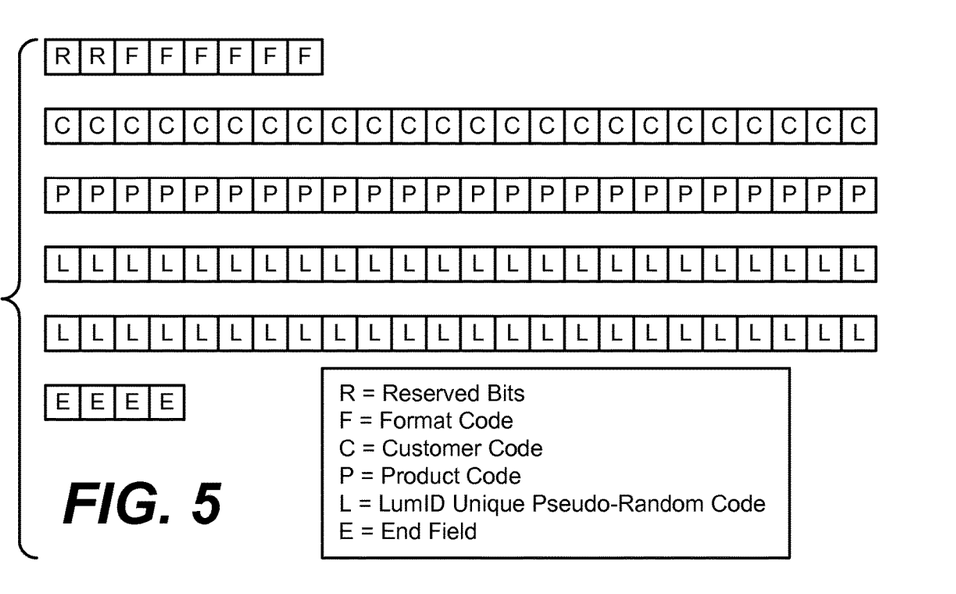
FIGS. 5-7 and 13 show embodiments of barcode data formats.

One embodiment of the covert barcode data and the overt barcode data is illustrated in FIG. 5, which shows 108 bits of data. Each square on FIG. 8 represents a bit. In one embodiment, 2 reserved bits (bits marked "R") are reserved for future use. In one embodiment, the covert barcode data and the overt barcode data also include a 6 bit format field (bits marked "F") which may contain a format code. In one embodiment, the format code is used to indicate the format of the data to follow. It allows for utilizing different data formats or adding new data formats over time. In one embodiment, the format field is expanded to 8 bits by incorporating the reserved bits ("R"). Data following the format field may vary depending on the format value in use.

In one embodiment, the covert barcode data and the overt barcode data include a 24-bit customer field (bits marked "C") which may contain a customer code. In one embodiment, the customer code is used to identify the customer associated with the article to which the covert barcode and the overt barcode are attached.

In one embodiment, the covert barcode data and the overt barcode data include a 24-bit product field (bits marked "P") which may contain a product code. In one embodiment, the product code identifies the product for the customer in the customer code field. In one embodiment, the product field identifies a product type and not an individual product instance.

In one embodiment, the covert barcode data and the overt barcode data include a 48-bit LumID Unique Pseudo-Random Code field (bits marked "P") which may contain a LumID unique pseudo-random code. In one embodiment, the LumID unique pseudo-random code is a pseudo-random number assigned to only the barcode in which it appears.

In one embodiment, the covert barcode data and the overt barcode data include a 4-bit end field (bits marked "E") which may be a reserved field.

Figure 6:
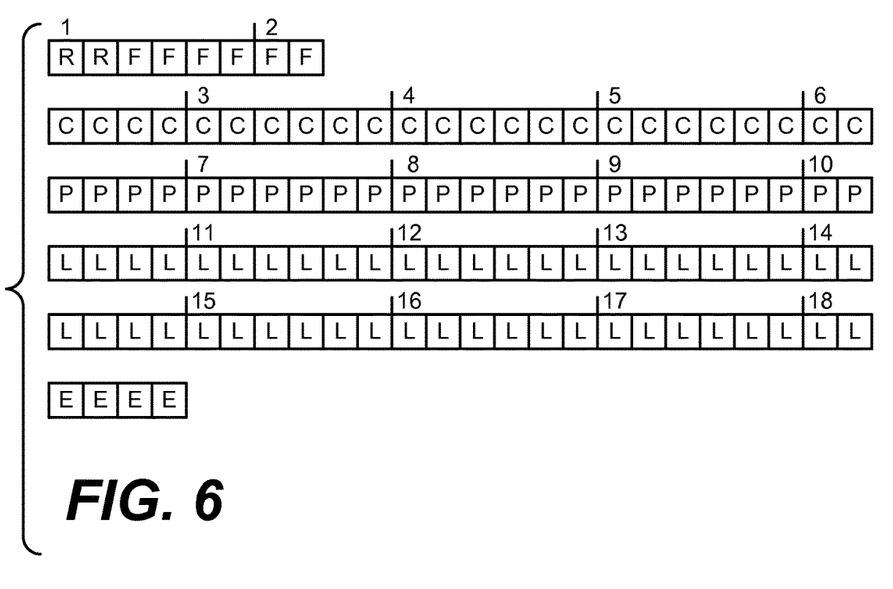

One embodiment of a technique for formatting the data into printable ASCII characters, shown in FIG. 6, includes dividing the 108 bits shown in FIG. 5 into 18 6-bit segments. Note that the 6-bit segment breaks do not necessarily align with the field breaks. FIG. 6 shows each 6-bit segment labeled by a corresponding number (1-18).

In one embodiment, each 6-bit segment is assigned a character value using base64 encoding, according to the following table:

| Character | Decimal Value | Binary Value |
| --- | --- | --- |
| A | 0 | 000000 |
| B | 1 | 000001 |
| C | 2 | 000010 |
| D | 3 | 000011 |
| E | 4 | 000100 |
| F | 5 | 000101 |
| G | 6 | 000110 |
| H | 7 | 000111 |
| I | 8 | 001000 |
| J | 9 | 001001 |
| K | 10 | 001010 |
| L | 11 | 001011 |
| M | 12 | 001100 |
| N | 13 | 001101 |
| O | 14 | 001110 |
| P | 15 | 001111 |
| Q | 16 | 010000 |
| R | 17 | 010001 |
| S | 18 | 010010 |
| T | 19 | 010011 |
| U | 20 | 010100 |
| V | 21 | 010101 |
| W | 22 | 010110 |
| X | 23 | 010111 |
| Y | 24 | 011000 |
| Z | 25 | 011001 |
| a | 26 | 011010 |
| b | 27 | 011011 |
| c | 28 | 011100 |
| d | 29 | 011101 |
| e | 30 | 011110 |
| f | 31 | 011111 |
| g | 32 | 100000 |
| h | 33 | 100001 |
| i | 34 | 100010 |
| j | 35 | 100011 |
| k | 36 | 100100 |
| l | 37 | 100101 |
| m | 38 | 100110 |
| n | 39 | 100111 |
| o | 40 | 101000 |
| p | 41 | 101001 |
| q | 42 | 101010 |
| r | 43 | 101011 |
| s | 44 | 101100 |
| t | 45 | 101101 |
| u | 46 | 101110 |
| v | 47 | 101111 |
| w | 48 | 110000 |
| x | 49 | 110001 |
| y | 50 | 110010 |
| z | 51 | 110011 |
| 0 | 52 | 110100 |
| 1 | 53 | 110101 |
| 2 | 54 | 110110 |
| 3 | 55 | 110111 |
| 4 | 56 | 111000 |
| 5 | 57 | 111001 |
| 6 | 58 | 111010 |
| 7 | 59 | 111011 |
| 8 | 60 | 111100 |

| Character | Decimal Value | Binary Value |
|-----------|---------------|--------------|
| 9 | 61 | 111101 |
| + | 62 | 111110 |
| / | 63 | 111111 |

It is understood that tables with different mappings from binary values to characters could be used. An example of the formatting illustrated in FIG. 6, shown in FIG. 7, results in the following printable string of ASCII characters: "BTu6JL1PZbEN8qczhK".

Figure 8:
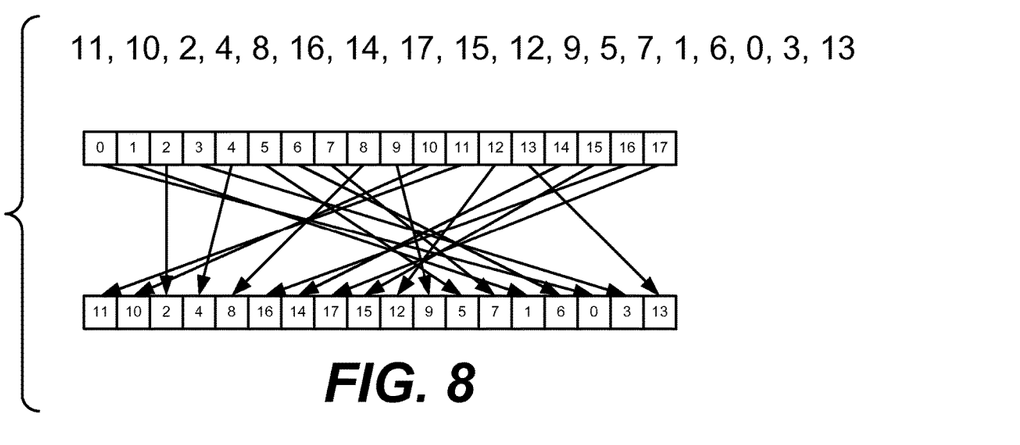
FIG. 8 shows an embodiment of a scrambling technique.

One embodiment of data scrambling, illustrated in FIG. 8, maps characters in an input string to assigned positions in an output string. For example, in FIG. 8 the character in position 0 of the input string maps to position 15 in the output string. In one embodiment, some of the characters may map to the same position. For example, in FIG. 8 the character in position 2 of the input string maps to position 2 in the output string. In some embodiments, mapping to the same position is prohibited. In one embodiment, only one scrambling technique is used. In one embodiment, a number of scrambling techniques may be used and the first n characters of the character string, where n is rarely greater than 2, include information as to which scrambling technique is being used. In that case, the first n characters are not scrambled.

Figure 7:
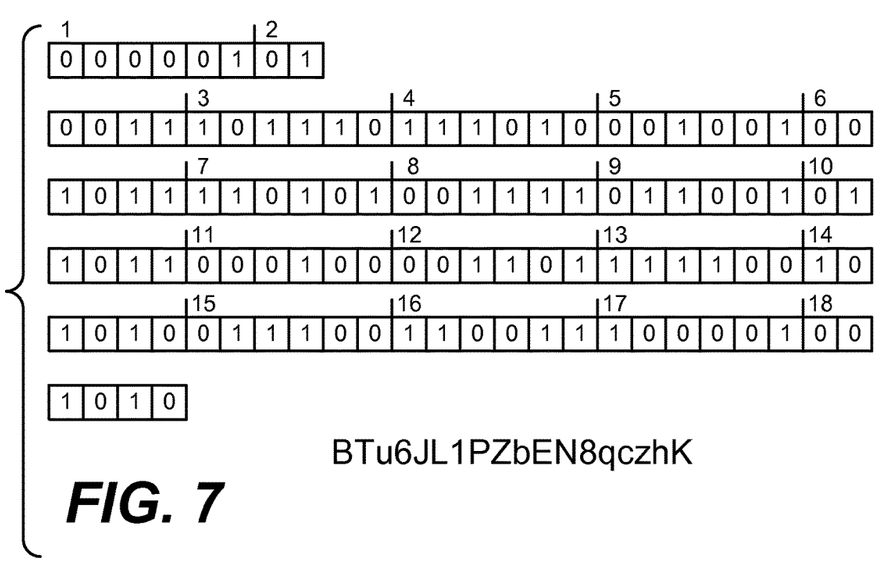
Figure 9:
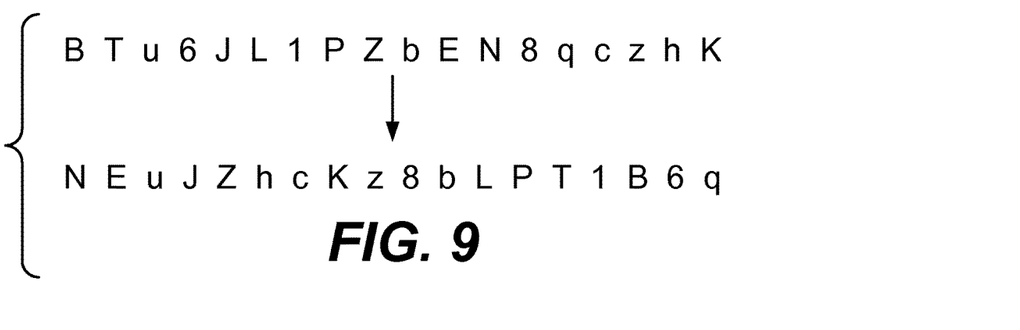
FIG. 9 shows an example of the results of the scrambling technique of FIG. 8.

An example, shown in FIG. 9, of applying the mapping in FIG. 8 to the string from FIG. 7 results in the string "NEuJZhcKz8bLPT1B6q".

Figure 10:
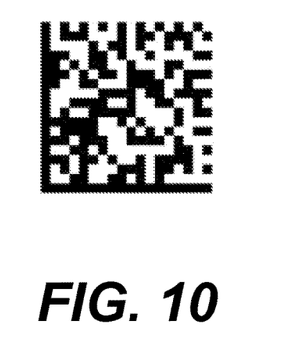
FIG. 10 shows an example barcode.

The resulting string is then sent to a barcode generator, which generates the barcode illustrated in FIG. 10.

The contents of the barcode need not be human readable. In fact, certain applications gain enhanced security if the contents of the barcode are not easy to interpret. The characters encoded in the barcode can possibly be extracted by standard barcode scanners or even by pictures taken of the barcode and provided to decoding software. To this end, applying a randomly generated set of unique printable characters to obtain an alternate base64 encoding makes interpreting the ASCII text in the barcode more difficult. However, given a large enough sample of barcodes generated in this manner, it may still be reasonably possible to determine this alternate encoding. The danger is further enhanced because some fields in the barcode format described above are nearly constant for large sets of barcodes. For example, a large number of barcodes may be produced with the same customer and product code. Since these fields do not change, recognizable patterns may appear in the barcode.

In one embodiment, a different random base64 encoding is used for each character position. For this format, 18 random base64 encodings can be generated with each character in the stream encoded using a separate randomized pattern. Thus, a character represents different values in different positions of the string. FIG. 11 illustrates a different randomized base64 encoding for each character in an 18-character string. Each row provides the encoding for a character position. Thus, the first row shows an encoding for the character at the first position, the second row for the second position and so forth. The columns are the various possible characters for the same 6-bit value as they vary by character position. For instance, the numeric value 0 could be represented by these characters, which correspond to the first column in FIG. 11:

C8I,<MxZH0|HXv9YF>

In one embodiment, multiple tables such as that shown in FIG. 11 are available so that alternate encodings for the entire set of character positions can be used. To achieve this, the 6 reserved bits (the two "R" bits and the four "E" bits) shown in FIG. 6 can define which table to use. If these bits are used to designate an encoding as shown in the character table above, 64 such character encodings are possible.

Figure 12:
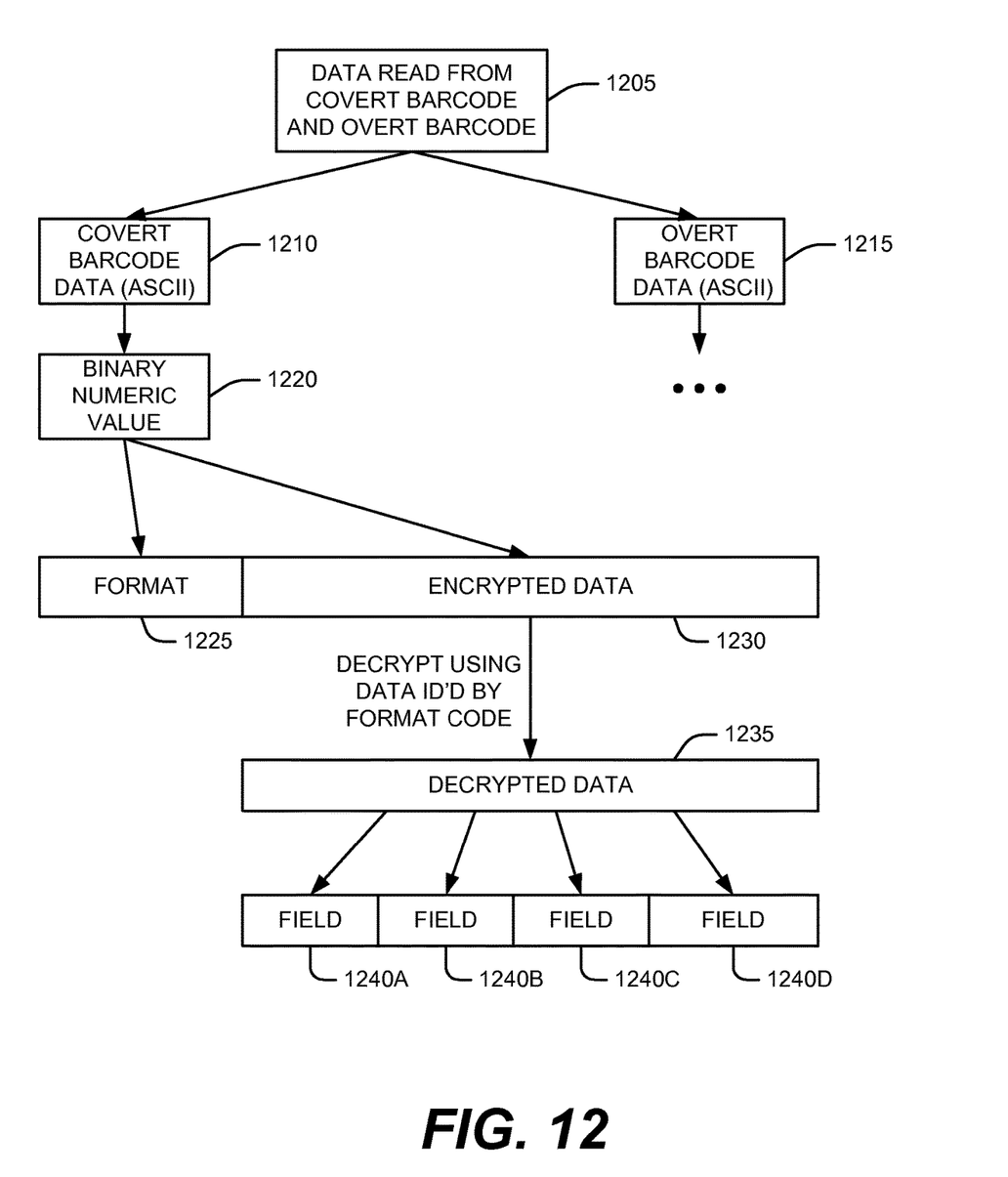
FIG. 12 shows an embodiment of the progression of data processing under one embodiment of a technique for reading a security feature.

In one embodiment, the overt barcode and the covert barcode are read essentially simultaneously. In one embodiment, the barcode reader will produce data 1205, as shown in FIG. 12, that includes data read from the covert barcode, i.e. covert barcode data 1210, and data read from the overt barcode, i.e. overt barcode data 1215. One embodiment of the processing of the covert barcode data 1210 will now be described. In one embodiment, the processing of the overt barcode data 1215 is similar and is not separately described. In one embodiment, in the circumstances in which the overt barcode data is provided by the customer, the overt barcode data receives only minimal processing before it is passed on to the customer.

In one embodiment, after optional descrambling and decoding, the covert barcode data 1210 is available as a binary numeric value 1220. In one embodiment, the binary numeric value 1220 includes an unencrypted format code 1225 and encrypted data 1230. In one embodiment, a decryption algorithm identified by the format code is used resulting in decrypted data 1235. The decrypted data is then resolved into fields 1240A-D.

Barcode scanners can provide a variety of information. Some barcode scanners provide more information than just the barcode data. For example, some barcode scanners report the type of barcode, its location in the image, quality information and the like. The consistency of this kind of information varies among the various brands of barcode scanners. Further, the type of connection between a barcode scanner and its host computer system can also limit the amount of information the host computer can receive. For instance, most barcode scanners can be placed into a mode indicating that the scanner should emulate a keyboard connected to a USB or RS-232 port. In such a mode, often only the barcode contents are returned with no additional information being available.

The overt and covert barcodes, when scanned, may be read simultaneously with the contents of both barcodes returned as part of the same operation. When this occurs, a method of determining which is the overt and which is the covert is useful. Due to the limitations described above, the barcode scanner may not be reliable to provide any further information than the alphanumeric barcode data.

In one embodiment, the format of the covert barcode is known. The format of the overt barcode may or may not be known. In the latter case, in one embodiment, the covert barcode is relied upon to provide identifying content.

In one embodiment, a field included in the barcode with a known value enhances the probability of identifying the covert barcode given only the alphanumeric values of each. Assuming the alphanumeric data alone is similar (for instance, all decimal values between 0 and 9), there is nothing immediately deterministic between the values. In one embodiment, the data can be converted to raw binary data and the bit streams can be searched for a fixed length field at a known position. This field can contain a fixed, known value. As the size of this field increases, the likelihood of positively identifying the covert barcode from the overt barcode increases. Since it is possible to have the selected bit pattern in both barcodes, the size of the field should be sufficiently large as to limit the likelihood of misidentification but not so large that it consumes an excessive amount of space in the covert barcode.

The table below shows the likelihood of positive identification for a selected subset of identification key sizes. As can be seen, the probability of positive identification rapidly increases as bits are added to the field size.

| Bits in Identification Key | Probability of Positive Identification |
|---|---|
| 1 | 50% |
| 2 | 75% |
| 3 | 87.5% |
| 4 | 93.75% |
| 5 | 96.875% |
| 6 | 98.4375 |
| 7 | 99.2188% |
| 8 | 99.6094% |
| 9 | 99.8047% |
| 10 | 99.9023% |
| 11 | 99.9512% |
| 12 | 99.9756% |
| 13 | 99.9878% |
| 14 | 99.9939% |
| 15 | 99.9969% |
| 16 | 99.9985% |
| 20 | 99.9999% |
| 24 | 99.999994% |
| 28 | 99.99999963% |
| 32 | 99.99999998% |

From the table it can be observed that at 20 bits and above, the chance of misidentifying the covert barcode is greater than or equal to 1 in 1,000,000. However, adding this many bits to the covert barcode increases its size substantially. A smaller size, for instance 6 bits, provides a 1 in 64 chance of misidentification. When dealing thousands of items to which barcodes can be applied in a single batch, this is likely insufficient.

Figure 13:
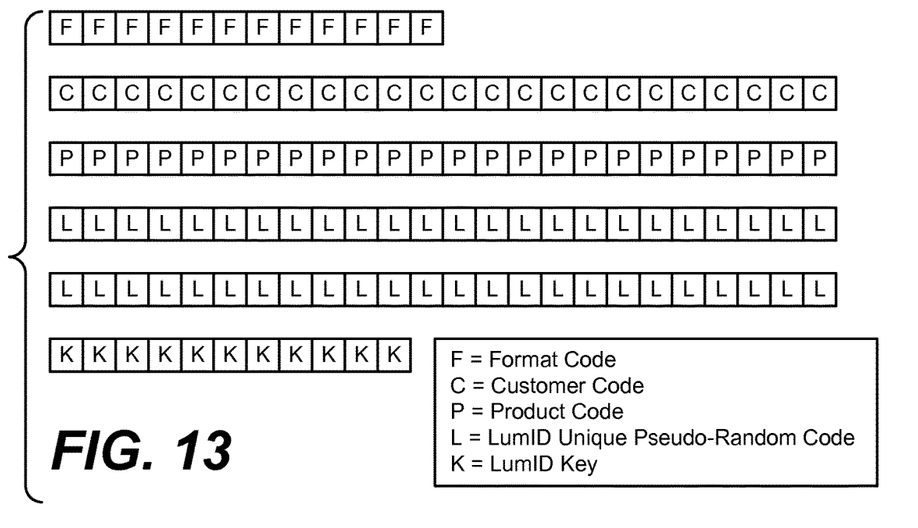

One embodiment of data, illustrated in FIG. 13, contains such a field, the LumID Key field, that is 11 bits long and provides a probability of positive identification in excess of 99.95 percent. Note that in FIG. 13, the format code has been increased to 12 bits, so that the data is 119 bits long.

If the identification key is used along with other available information, the chances of proper identification can be improved significantly. The following information is generally available from a barcode scan:

The length of the decoded barcode string

The ASCII content of the barcode string

If the covert barcode is always of a known length and padded to always be that length, the lengths of the two barcode strings alone can sufficiently provide identification.

If the covert barcode is known to always be encoded using only the characters 0-9 but one of the barcode strings contains the letter A, this information can be used to sufficiently provide identification.

The information associated with the length and alphanumeric content of the two barcodes cannot, however, be determined without knowing something about the overt barcode format.

To address this problem, in one embodiment, the covert barcode contains a format field indicating what rule set should be used to parse the rest of the data in the barcode. This includes the identification key including its location and size within the barcode data.

In other embodiments, the overt barcode may include similar information.

Figure 14:
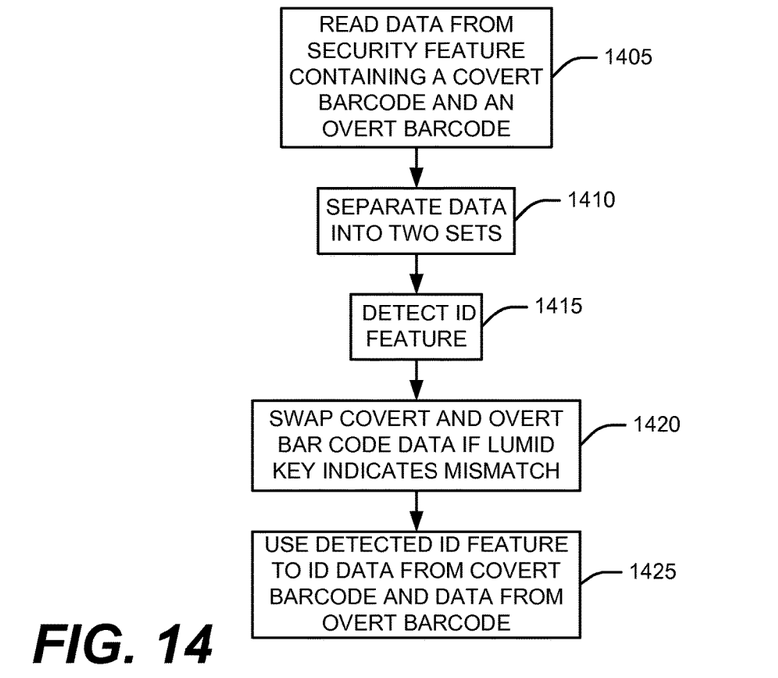
FIG. 14 shows an embodiment of a flow chart for distinguishing data from a covert barcode from data from an overt bar code.

One embodiment of the process of detecting the covert barcode and the overt barcode, illustrated in FIG. 14, begins by reading data from the security feature (i.e., the covert bar code and the overt barcode) (block 1405). The data is separated into two sets, the covert barcode data and the overt barcode data (block 1410), where the identification of the two sets is provisional and subject to subsequent correction. The ID feature (e.g., the LumID Key field) is then detected (block 1415). If the ID feature indicates that the covert barcode data has been misidentified as the overt barcode data, or vice versa, the covert barcode data is swapped with the overt barcode data (block 1420). If it was not done in block 1420, the ID feature is used to identify the covert barcode data and the covert bar code data (block 1425).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for creating a barcode, comprising:
   concatenating data fields of binary bits to be represented in the barcode;
   partitioning the concatenated data into n-bit segments to establish formatted data;
   encoding the formatted data by assigning a respective code to each n-bit segment; and
   creating the barcode using the encoded data and including within the barcode an expandable format field that includes a format code that indicates a format for the encoded data and including within the barcode the format code within a first bit segment of the barcode, wherein creating the barcode includes creating a covert portion in the barcode and an overt portion in the barcode, wherein the covert portion is invisible to an eye and includes a color that matches a substrate color of a substrate to which the barcode is to be applied, and wherein creating further includes printing the covert portion onto the substrate as a photoluminescent material that is printed on the substrate proximate to the overt portion.

2. The method of claim 1 further comprising: scrambling the encoded data.

3. The method of claim 2 wherein scrambling the encoded data comprises:
   changing the positions of at least some of the n-bit segments.

4. The method of claim 2 wherein scrambling the encoded data comprises:
   changing the positions of at least some of the n-bit segments but not the first M n-bit segments;
   where the first M n-bit segments define how the encoded data is scrambled.

5. The method of claim 1 wherein assigning a respective code to each n-bit segment comprises:
   assigning each n-bit segment a code using base$2^n$ encoding.

6. The method of claim 1 wherein assigning a respective code to each n-bit segment comprises:
   assigning each n-bit segment a code using base64 encoding.

7. The method of claim 1 wherein each n-bit segment has a position within the assembled data and assigning a respective code to each n-bit segment comprises:
    looking up the respective code to be assigned to each n-bit segment in a table based on the position of the n-bit segment within the assembled data and the value of the n-bit segment.

8. The method of claim 1 wherein each n-bit segment has a position within the assembled data and assigning a respective code to each n-bit segment comprises:
    looking up the respective code to be assigned to each n-bit segment in one of a plurality of tables based on the position of the n-bit segment within the assembled data and the value of then-bit segment.

9. The method of claim 1 wherein the data fields of bits comprise a format code field, a customer code field, a product code field and an end field, and all of said fields do not have the same number of bits therein.

10. The method of claim 9 wherein the data fields of bits further comprise a reversal field and a LumID unique pseudo-random code.

11. The method of claim 1 wherein partitioning the concatenated data results in grouping bits from two different fields.

12. A barcode creation system, comprising:
    a data concatenator for concatenating data fields of binary bits to be represented in the barcode;
    a data partitioner for partitioning the concatenated data into n-bit segments to establish formatted data;
    a data encoder for encoding the formatted data by assigning a respective code to each n-bit segment; and
    barcode creator for creating the barcode using the encoded data and for including within the barcode an expandable format field that includes a format code that indicates a format for the encoded data and including within the barcode the format code within a first bit segment of the barcode, wherein the barcode creator is configured to create the barcode with a covert portion in the barcode and an overt portion in the barcode, wherein the covert portion is invisible to an eye and includes a color that matches a substrate color of a substrate to which the barcode is to be applied, and wherein the covert portion includes a photoluminescent material printed on the substrate and proximate to the overt portion.

13. The barcode creation system of claim 12 further comprising:
    a data scrambler for scrambling the encoded data.

14. The barcode creation system of claim 13 wherein scrambling the encoded data comprises:
    a position changer for changing the positions of at least some of the n-bit segments.

15. The barcode creation system of claim 13 wherein scrambling the encoded data comprises:
    a position changer for changing the positions of at least some of the n-bit segments but not the first M n-bit segments;
    where the first M n-bit segments define how the encoded data is scrambled.

16. The barcode creation system of claim 12 wherein assigning a respective code to each n-bit segment comprises:
    a segment assigner for assigning each n-bit segment a code using base$2^n$ encoding.

17. The barcode creation system of claim 12 wherein assigning a respective code to each n-bit segment comprises:
    a segment assigner for assigning each n-bit segment a code using base64 encoding.

18. The barcode creation system of claim 12 wherein each n-bit segment has a position within the assembled data and assigning a respective code to each n-bit segment comprises:
    a code searcher for looking up the respective code to be assigned to each n-bit segment in a table based on the position of the n-bit segment within the assembled data and the value of the n-bit segment.

19. The barcode creation system of claim 12 wherein each n-bit segment has a position within the assembled data and assigning a respective code to each n-bit segment comprises:
    a code searcher looking up the respective code to be assigned to each n-bit segment in one of a plurality of tables based on the position of the n-bit segment within the assembled data and the value of the n-bit segment.

20. The barcode creation system of claim 12 wherein the data fields of bits comprise a customer code field and a product code field.

* * * * *